(12) United States Patent
Schweng et al.

(10) Patent No.: US 7,400,332 B2
(45) Date of Patent: Jul. 15, 2008

(54) HEXAGONAL COLOR PIXEL STRUCTURE WITH WHITE PIXELS

(75) Inventors: Detlef Schweng, Weinstadt-Schnait (DE); Stefan Spaeth, Renningen (DE)

(73) Assignee: Oigital Imaging Systems GmbH, Kirchheim/ Teck-Nabern (DE)

( * ) Notice: Subject to any disclaimer, the term of this patent is extended or adjusted under 35 U.S.C. 154(b) by 318 days.

(21) Appl. No.: 11/032,540

(22) Filed: Jan. 10, 2005

(65) Prior Publication Data
US 2006/0146067 A1    Jul. 6, 2006

(30) Foreign Application Priority Data
Jan. 5, 2005    (EP) .................................. 05368001

(51) Int. Cl.
G09G 5/02 (2006.01)
H04N 1/64 (2006.01)
H04N 3/15 (2006.01)
H04N 9/04 (2006.01)
G09G 5/10 (2006.01)
H04N 9/083 (2006.01)
H04N 9/68 (2006.01)

(52) U.S. Cl. .................. 345/589; 345/591; 345/600; 345/604; 345/698; 348/234; 348/238; 348/273; 358/512; 358/514; 358/516; 358/518; 382/162; 382/167

(58) Field of Classification Search .............. 345/426, 345/428, 589–593, 596–597, 600, 601, 604, 345/606, 690, 695, 698; 358/512–520, 525, 358/535; 382/162–167; 348/234, 238, 273, 348/236
See application file for complete search history.

(56) References Cited

U.S. PATENT DOCUMENTS
4,580,160 A * 4/1986 Ochi et al. .................. 348/276
(Continued)

FOREIGN PATENT DOCUMENTS
EP    472299 A    2/1992

OTHER PUBLICATIONS
Girish Tirunelveli, Richard Gordon. Stephen Pistorid, Comparison of Square-Pixel and Hexagonal-Pixel Resolution in Image Processing, [online], 2002 IEEE, [retrieved on Aug. 30, 2007]. Retrieved from the Internet: http:llieeexplore.ieee.orglie1517909121812/01013056.pdf, pp. 867-872.*
(Continued)

Primary Examiner—Wesner Sajous
(74) Attorney, Agent, or Firm—Saile Ackerman LLC; Stephen B. Ackerman

(57)    ABSTRACT

A digital color imager provides an extended luminance range, enabling a method for an easy transformation into all other color spaces having luminance as a component. White pixels are added to hexagonal red, green and blue pixels. These white pixels can alternatively have an extended dynamic range as described by U.S. Pat. No. (6,441,852 to Levine et al.). Especially the white pixels may have a larger size than the red, green, or blue pixels used. This larger size can be implemented by concatenation of "normal" size hexagonal white pixels. The output of said white pixels can be directly used for the luminance values Y of the destination color space. Therefore only the color values have to be calculated from the RGB values, leading to an easier and faster calculation. As an example chosen by the inventor the conversion to YCbCr color space has been shown in detail.

50 Claims, 4 Drawing Sheets

U.S. PATENT DOCUMENTS

| | | | |
|---|---|---|---|
| 5,311,337 A * | 5/1994 | McCartney, Jr. | 349/145 |
| 6,236,434 B1 | 5/2001 | Yamada | 348/315 |
| 6,441,852 B1 * | 8/2002 | Levine et al. | 348/302 |
| 6,456,793 B1 * | 9/2002 | Ray et al. | 396/89 |
| 6,473,516 B1 * | 10/2002 | Kawaguchi et al. | 382/100 |
| 6,642,962 B1 * | 11/2003 | Lin et al. | 348/252 |
| 6,646,246 B1 * | 11/2003 | Gindele et al. | 250/208.1 |
| 6,714,243 B1 * | 3/2004 | Mathur et al. | 348/273 |
| 2003/0016295 A1 | 1/2003 | Nakakuki | 348/272 |
| 2003/0086008 A1 | 5/2003 | Nagano | 348/272 |
| 2004/0114047 A1 * | 6/2004 | Vora et al. | 348/340 |
| 2005/0248667 A1 * | 11/2005 | Schweng et al. | 348/234 |

OTHER PUBLICATIONS

Co-pending U.S. Patent App. DS-03-021, U.S. Appl. No. 10/859,797, filed Jun. 3, 2004, "Extended Dynamic Range in Color Imagers", assigned to the same assignee as the present invention.

Co-pending U.S. Patent DS-04-056A, U.S. Appl. No. 11/032,538, filed Jan. 10, 2005, "Hexagonal Color Pixel Structure with White Pixels", assigned to the same assignee as the current invention.

* cited by examiner

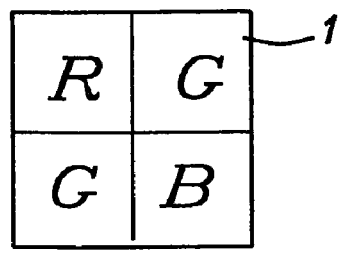
FIG. 1 - Prior Art
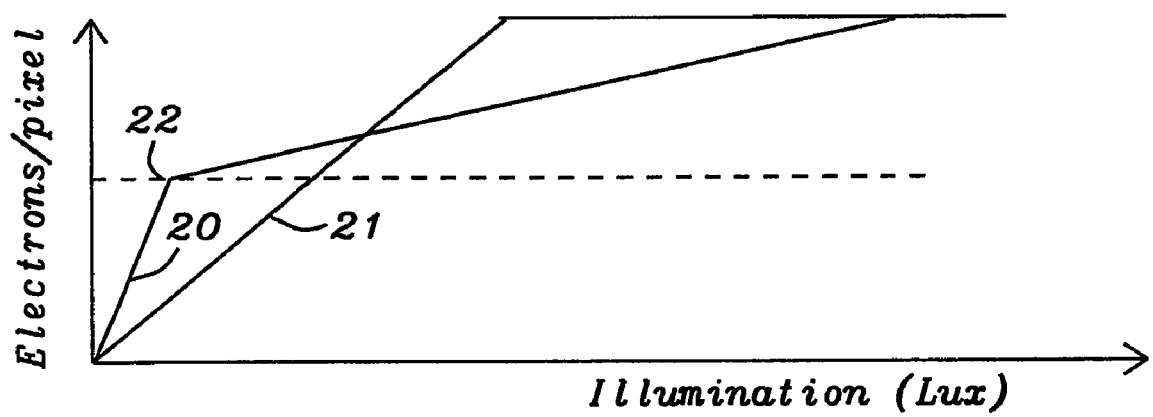
FIG. 2 - Prior Art
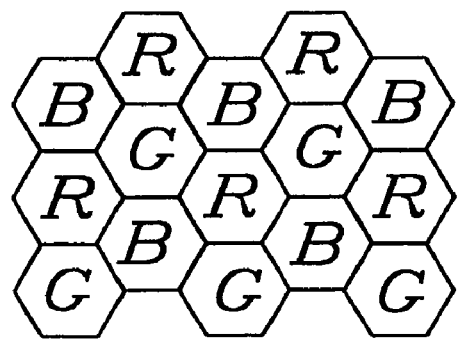
FIG. 3 - Prior Art

HEXAGONAL COLOR PIXEL STRUCTURE WITH WHITE PIXELS

RELATED PATENT APPLICATION

This application is related to U.S. patent application Ser. No. 11/032,538 and filed Jan. 10, 2005 owned by a common assignee as the instant invention.

BACKGROUND OF THE INVENTION (1) Field of the Invention

This invention relates generally to digital image processing and relates more particularly to a digital color imager and related methods having an improved luminance representation using hexagonal pixels comprising white and color pixels.

(2) Description of the Prior Art

Color is the perceptual result of light in the visible region of the spectrum, having wavelengths in the region of 400 nm to 700 nm, incident upon the retina. The spectral distribution of light relevant to the human eye is often expressed in 31 components each representing a 10 nm band.

The human retina has three types of color photoreceptors cone cells, which respond to incident radiation with somewhat different spectral response curves. Because there are exactly three types of color photoreceptor, three numerical components are necessary and sufficient to describe a color, providing that appropriate spectral weighting functions are used. These cones provide the "photopic" vision.

Photoreceptors are not distributed evenly throughout the retina. Most cones lie in the fovea, whereas rods dominate peripheral vision. Rods handle the short wavelength light, up to about 510 nm. The number of rods is much higher than the number of cones. They are very sensitive to very low levels of light. These rods provide the "scotopic" vision. There is no color in scotopic vision and it is processed as grayscale.

Since the human eye has more photoreceptors handling black and white compared to colors luminance is more important to vision as colors.

Pixel values in accurate gray-scale images are based upon broadband brightness values. Pixel values in accurate color images are based upon tristimulus values. Color images are sensed and reproduced based upon tristimulus values, whose spectral composition is carefully chosen according to the principles of color science. As their name implies, tristimulus values come in sets of three. In most imaging systems, tristimulus values are subjected to a non-linear transfer function that mimics the lightness response of vision. Most imaging systems use RGB values whose spectral characteristics do not exactly match the tristimulus values of the human eyes.

A combination of real world physical characteristics determines what the human vision system perceives as color. A color space is a mathematical representation of these characteristics. Color spaces are often three-dimensional. There are many possible color space definitions.

Digital cameras have either RGB representation (RGB in one pixel) or Bayer representation, wherein the pixels are arranged as shown in FIG. 1 prior art. In a 2×2 cell 1 are one red (R) pixel, one blue (B) pixel and two green (G) pixels.

Another color space is Hue, Saturation and Luminance (or HSL). In this color space scenes are not described in terms of red, green, and blue, but as hue, saturation, and luminance (HSL). We see things as colors, or hues that either have a washed-out look or have deep, rich tones. This means having low or high saturation, respectively. Hue is the attribute of a visual sensation according to which an area appears to be similar to one of the perceived colors, red, green and blue, or a combination of them. Saturation is the colorfulness of an area judged in proportion to its brightness.

By color saturation control is meant the process to increase or decrease the amount of color in an image without changing the image contrast. When saturation is lowered the amount of white in the colors is increased (washed out). By adjusting the color saturation the same image can be everything from a black and white image to a fully saturated image having strong colors.

Usually different color spaces are being used to describe color images. YUV and YCbCr color spaces are getting more and more important.

The YUV color space is characterized by the luminance (brightness), "Y", being retained separately from the chrominance (color). There is a simple mathematical transformation from RGB: Y is approximately 30% Red, 60% Green, and 10% Blue, the same as the definition of white above. U and V are computed by removing the "brightness" factor from the colors. By definition, U=Blue-Yellow, thus U represents colors from blue (U>0) to yellow (U<0). Likewise V=Red-Yellow, thus V represents colors from magenta (V>0) to Cyan (blue green) (V<0)

The YCbCr color space was developed as part of recommendation CCIR601. YCbCr color space is closely related to the YUV space, but with the color coordinates shifted to allow all positive valued coefficients:

$$Cb=(U/2)+0.5$$

$$Cr=(V/1.6)+0.5,$$

wherein the luminance Y is identical to the YUV representation.

U.S. Pat. No. (6,441,852 to Levine et al.) describes an extended dynamic range imager. An array of pixels provides an output signal for each pixel related to an amount of light captured for each pixel during an integration period. A row of extended dynamic range (XDR) sample and hold circuits having an XDR sample and hold circuit for each column of the array captures an XDR signal related to a difference between the output signal and an XDR clamp level to which the pixel is reset at a predetermined time before the end of the integration period. A row of linear sample and hold circuits having a linear sample and hold circuit for each column of the array captures a linear signal related to a difference between the output signal and an initial output signal to which the pixel is reset at the beginning of the integration period.

FIG. 2 prior art shows a diagram of the relationship between illumination and the yield of electrons per pixel of a "normal" imager 21 and an XDR imager 20. It shows that the resolution of the XDR imager 20 is much higher in low illumination condition than the resolution of "normal" imagers. In case the illumination is higher than the XDR breakpoint 22 the additional yield of electrons is reduced significantly.

XDR enhances the performance especially in low-light conditions. The XDR APS also uses individual pixel addressing to reduce column overload, or "blooming". The excess charge is absorbed in substrate and adjacent pixel drain regions.

Since a few years cameras are available having hexagonal pixels instead of square pixels. FIG. 3 prior art illustrates a typical arrangement of hexagonal RBG pixels. A key advantage of an arrangement of hexagonal pixels is that the distance between a given pixel and its immediate neighbours is the same. Furthermore hexagonal sampling requires 13% fewer samples than rectangular sampling. Principally an arrangement of hexagonal pixels models human visual system more precisely than square pixels. The cone distribution on the human fovea resembles more a hexagonal arrangement of pixels than a square arrangement of pixels.

Nevertheless, it is a challenge for the designers of digital imagers to achieve solutions providing images being almost equivalent to human vision.

There are patents or patent applications related to this area:

U.S. Pat. No. (6,642,962 to Lin et al.) describes a digital-camera processor receiving mono-color digital pixels from an image sensor. Each mono-color pixel is red, blue, or green. The stream of pixels from the sensor has alternating green and red pixels on odd lines, and blue and green pixels on even lines in a Bayer pattern. Each mono-color pixel is white balanced by multiplying with a gain determined in a previous frame and then stored in a line buffer. A horizontal interpolator receives an array of pixels from the line buffer. The horizontal interpolator generates missing color values by interpolation within horizontal lines in the array. The intermediate results from the horizontal interpolator are stored in a column buffer, and represent one column of pixels from the line buffer. A vertical interpolator generates the final RGB value for the pixel in the middle of the column register by vertical interpolation. The RGB values are converted to YUV. The vertical interpolator also generates green values for pixels above and below the middle pixel. These green values are sent to an edge detector. The edge detector applies a filter to the 3 green values and 6 more green values from the last 2 clock cycles. When an edge is detected, an edge enhancer is activated. The edge enhancer adds a scaled factor to the Y component to sharpen the detected edge. Color enhancement is performed on the U and V components. The line buffer stores only 4 full lines of pixels and no full-frame buffer is needed.

U.S. Patent (2003/0016295 to Nakakuki) discloses an invention, making it possible to display an image signal with as a high picture quality as would have been obtained with a solid image pick-up device having color filters arrayed in a mosaic pattern. The image signal obtained from the solid image pick-up device with a Bayer array of the three primary colors of R, G, and B is separated by a color separation circuit into R-color, G-color, and B-color signals. These color signals are attenuated by filters respectively at half a horizontal sampling frequency in order to suppress the occurrence of moire noise. The G-color filter circuit has a narrower attenuation bandwidth than that of the R-color filter circuit and the B-color filter circuit. These color signals thus filtered are adjusted in level at a white balance circuit and then mixed by addition at a mixer, thus generating a luminance signal. By narrowing the attenuation bandwidth of the G-color signal, the resolution can be kept high while suppressing the occurrence of moire noise.

U.S. patent application Publication (2004/0114047 to Vora et al.) describes a method providing for demosaicing an offset geometric array. The method comprises the step of arranging a plurality of sensors in an offset geometric array. The sensors have a defined geometric shape for each sensor and its respective sensor sample. Another step is moving first sample from the sensor in an odd row of the offset geometric array to an uppermost point of a geometric shape. A further step is moving second sample from the sensor in an even row of the offset geometric array to a point that is vertically aligned with the first sample from the odd row. The point is also contained within the same geometric shape as the first sample from the odd row.

SUMMARY OF THE INVENTION

A principal object of the present invention is to achieve a digital color imager providing an extended luminance range.

Another object of the invention is to achieve a method for an easier transformation of the pixel output of a digital color imager into a color space having luminance as component.

In accordance with the objects of this invention a digital color imager providing an extended luminance range comprising hexagonal red, green, blue and white pixels has been achieved.

In accordance with the further objects of this invention a digital color imager, providing an extended luminance range, is comprising red, green, blue and white pixels, wherein said red, green and blue pixels have a same size and have a hexagonal shape and said white pixels comprise more than one concatenated hexagonal white pixels, wherein the pixels used for concatenation have the same size as said red, green or blue pixels.

In accordance with a further object of this invention a method to convert pixel color values of a digital color imager into another color space having luminance as a component has been achieved. Said method comprises, first, to provide an digital color imager comprising hexagonal red, green, blue and white pixels, and to use sensor output of white pixels for luminance value Y. Finally the method invented comprises to calculate color values of destination color space from the output of the red, green and blue pixels using a correspondent conversion matrix.

In accordance with a further object of this invention another method to convert pixel color values of a digital color imager into a color space having luminance as component has been achieved. Said method comprises, first, to provide a digital color imager comprising hexagonal red, green, and blue pixels and additionally white pixels, wherein said white pixels have been concatenated from hexagonal white pixels. The next steps of the method invented comprise to use sensor output of white pixels for luminance value Y, and to calculate color values of destination color space from the output of the red, green and blue pixels using a correspondent conversion matrix.

In accordance with a further object of this invention a method to convert pixel color values of a digital color imager into YCbCr color space has been achieved. Said method comprises to provide a digital color imager comprising hexagonal red, green, blue and white pixels, to use sensor output of white pixel for luminance value Y, and to calculate color values Cb and Cr from the output of the red, green and blue pixels using transformation parameters.

In accordance with a further object of this invention another method to convert pixel color values of a digital color imager into YCbCr color space has been achieved. Said method comprises to provide a digital color imager comprising hexagonal red, green, and blue pixels and additionally white pixels, wherein said white pixels have been concatenated from hexagonal white pixels, to use sensor output of white pixels for luminance value Y. and to calculate color values Cb and Cr from the output of the red, green and blue pixels using transformation parameters.

BRIEF DESCRIPTION OF THE DRAWINGS

In the accompanying drawings forming a material part of this description, there is shown:

FIG. 1 prior art shows a Bayer arrangement of red, green and blue pixels.

FIG. 2 prior art describes a diagram of the output of an extended dynamic range pixel as function of the illumination compared to a normal pixel output.

FIG. 3 prior art illustrates an arrangement of hexagonal red, green and blue pixels.

DESCRIPTION OF THE PREFERRED EMBODIMENTS

The preferred embodiments disclose a novel imager and related methods to improve the luminance representation of digital images by interspersing white hexagonal pixels to red, green and blue hexagonal pixels. These hexagonal white pixels could be extended dynamic range (XDR) pixels as disclosed in U.S. Pat. No. (6,441,852 to Levine et al.) issued Aug. 27, 2002.

Such an imager could be used in a video or still camera, in scanners or other image capturing devices.

Figure 4A:
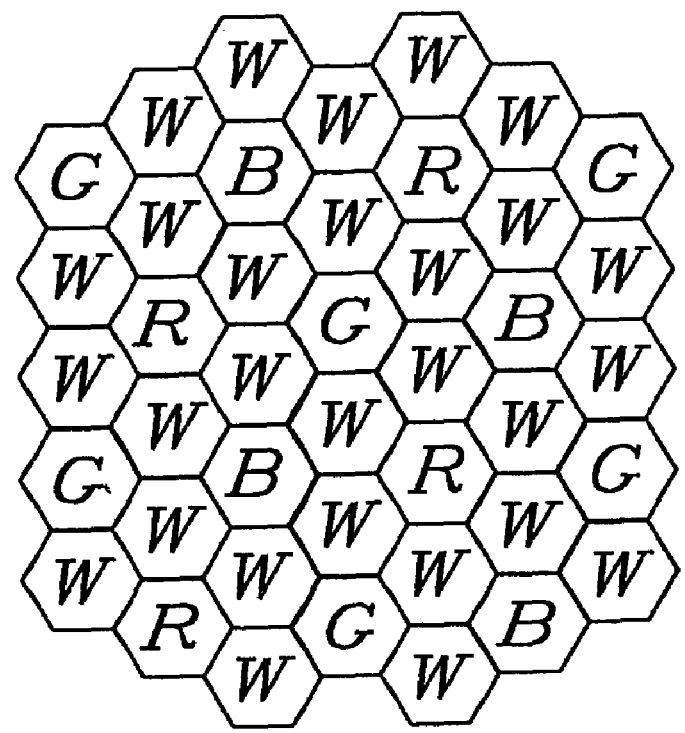
FIG. 4a illustrates an arrangement of hexagonal white, red, green and blue pixels.

FIG. 4a shows an example of a preferred embodiment of the invention, which teaches interspersing of hexagonal white pixels with hexagonal red, green and blue pixels. It may be called an "extended Bayer representation" of colors comprising white, red, green and blue hexagonal pixels. In the preferred embodiment shown in FIG. 4a the interspersing is performed according the following rules:

1. Each white pixel must be adjacent to one red, one green and one blue pixel.
2. Each red, green or blue pixel must be surrounded by white pixels only.

The deployment of red, white green and blue pixels could also follow different rules. Using the rules shown above a very good resolution has been achieved.

It is important to understand that it is possible to stretch the hexagonal pixels in direction in x-direction or in y-direction. This means that they are no more equilateral as shown in FIG. 4a.

Figure 4B:
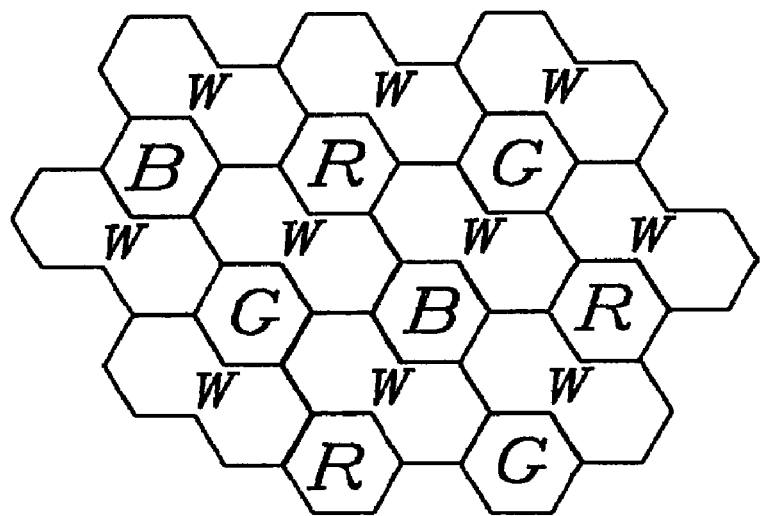
FIG. 4b illustrates an arrangement of hexagonal red, green and blue pixels being interspersed with white pixels wherein the white pixels have a shape of two concatenated "normal" size hexagonal pixels.

Furthermore especially the size of the white pixels can be enlarged having a shape of concatenated hexagonal pixels. FIG. 4b shows, as example only, white pixels having a shape of two concatenated hexagonal pixels.

It has to be understood that there is a multitude of different ways to concatenate pixels. The concatenation has to be performed in way that the concatenated pixels match in their shape to the other "normal" size pixels. Therefore the shape of whole hexagonal pixels, or the shape of portions of hexagonal pixels, form usually the basis of concatenations.

Figure 4C:
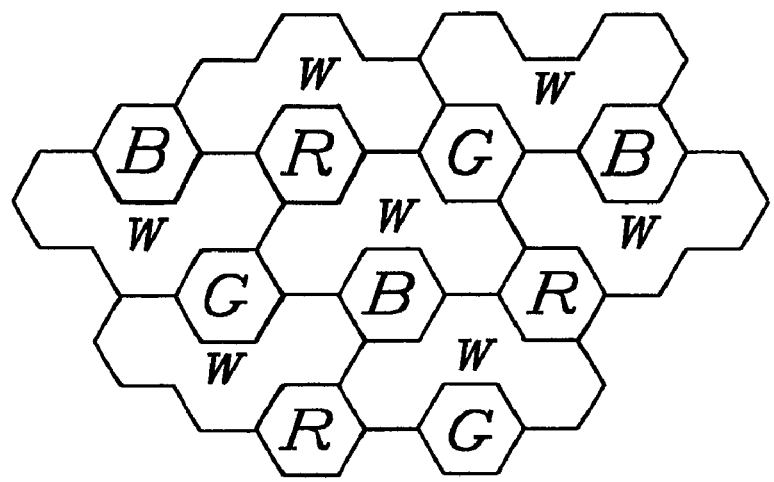
FIG. 4c illustrates an arrangement of hexagonal red, green and blue pixels being interspersed with white pixels wherein the white pixels have a shape of three concatenated "normal" size hexagonal pixels.
Figure 4D:
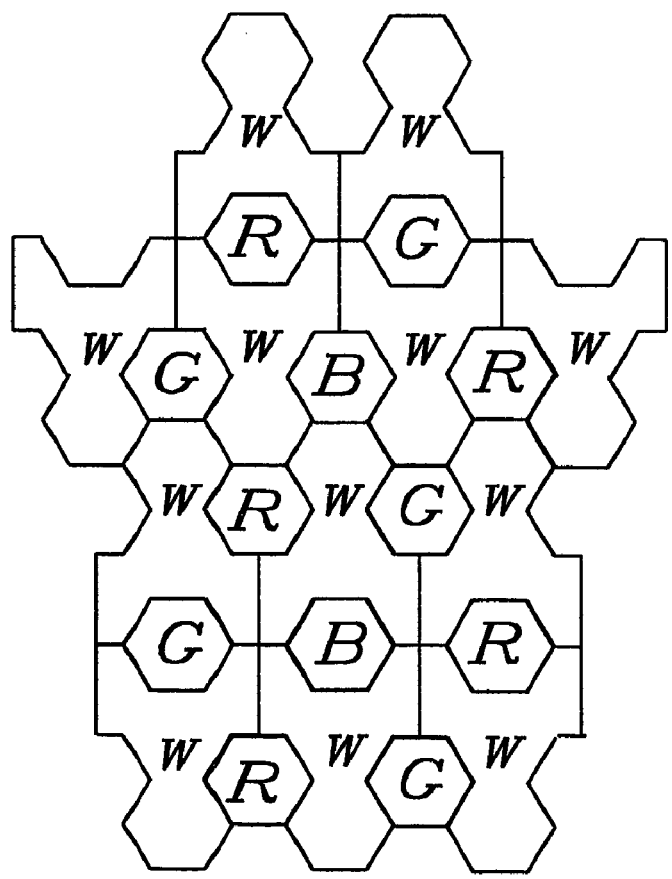
FIG. 4d illustrates an arrangement of hexagonal red, green and blue pixels being interspersed with white pixels wherein the white pixels have a shape of two separate halves of "normal" size hexagonal pixels added to two "normal" size hexagonal pixels.

FIGS. 4c-d show more examples how concatenation of pixels can be performed. FIG. 4c shows, as another example, white pixels having a shape of three concatenated hexagonal pixels and FIG. 4d shows an arrangement of hexagonal red, green and blue pixels being interspersed with white pixels, wherein the white pixels have a shape of two separate halves of "normal" size hexagonal pixels added to two "normal" size hexagonal pixels.

It is important to understand that the same rules as outlined in regard of FIG. 4a are applied in the case of concatenated pixels as shown in the examples of FIGS. 4b-d, namely that each white pixel must be adjacent to one red, one green and one blue pixel and each red, green or blue pixel must be surrounded by white pixels only.

Furthermore it is possible to use XDR-type pixels for any kind of the white, red, green and blue pixels. Furthermore extended size white pixels of XDR-type can be used having e.g. the size of two or more normal size pixels.

Luminance is a component of many color spaces as e.g. YCbCr, YUV, CMYK, HIS, etc. Conversions from RGB to one of those color spaces having luminance as component can be performed by a matrix or vector operation. As example there is a well-known equation to transform pixel data from RGB to YCbCr color space:

$$\begin{bmatrix} Y \\ Cb \\ Cr \end{bmatrix} = \begin{bmatrix} 0.299 & 0.587 & 0.114 \\ -0.169 & -0.331 & 0.5 \\ 0.5 & -0.81 & -0.81 \end{bmatrix} \times \begin{bmatrix} R \\ G \\ B \end{bmatrix}, \quad (1)$$

wherein R, G, B are the values of Red, Green and Blue as components of the RGB color space, and Y is the luminance and Cb and Cr are the color values as components of the YCbCr color space.

Using an "extended" Bayer representation as a key part of the present invention, as shown e.g. in FIG. 4a or in FIG. 4b, the white pixels W shown in FIG. 4a and in FIG. 4b already yield the luminance value Y of the YCbCr color space. Therefore the transformation from the RGB to YCbCr color space is easier and faster to be calculated. The luminance Y is already provided by the white pixel, the color values Cb and Cr can be calculated according to the following equation:

$$\begin{bmatrix} Cb \\ Cr \end{bmatrix} = \begin{bmatrix} -0.169 & -0.331 & 0.5 \\ 0.5 & -0.419 & -0.81 \end{bmatrix} \times \begin{bmatrix} R \\ G \\ B \end{bmatrix}, \quad (2)$$

It is obvious that equation (2), shown above, is easier to be calculated compared to equation (1) wherein the value of luminance has to be calculated additionally.

It has to be understood that the transformation to an YCbCr color space is just an example, a transformation to other color spaces having luminance as component could be performed in a very similar way.

Figure 5:
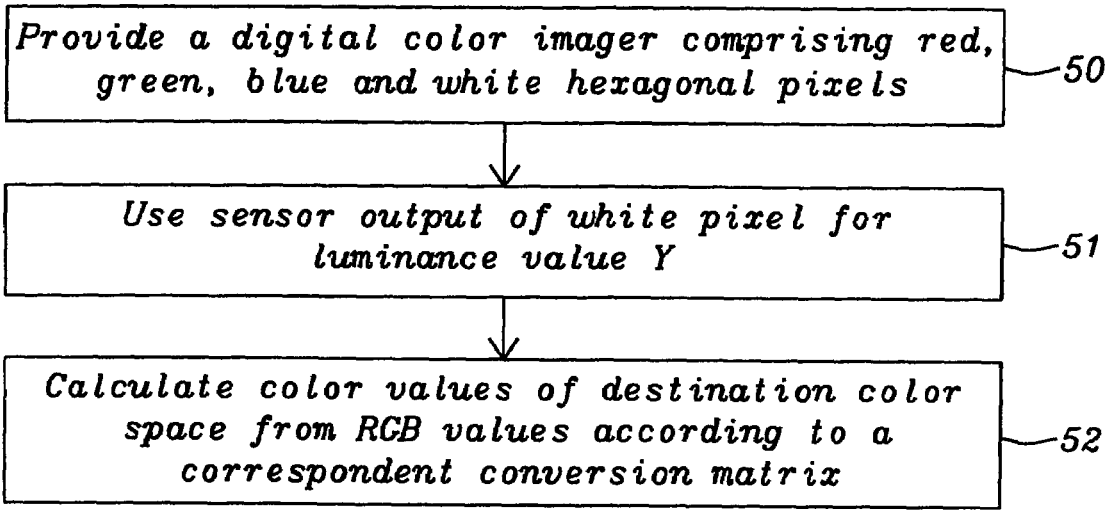
FIG. 5 shows a flowchart of a method to convert the output of hexagonal red, green, blue and white pixels into another color space having luminance as a component.

FIG. 5 describes a method to convert the RGB values of an imager of the present invention comprising red, green, blue and white hexagonal pixels into another color space having luminance as a component, such as e.g. YIQ, YUV, CMYK. Step 50 describes the provision of red, green, blue and white hexagonal pixels in a digital color imager. Alternatively the white pixels can have a larger size than the red, green, or blue pixels, wherein the white pixels have a shape of concatenated whole hexagonal pixels or having a shape of concatenated whole hexagonal pixels concatenated again with fractions of hexagonal pixels as illustrated in FIGS. 4*b-d*. All pixels, or some of them could be of the XDR type. The concatenated white pixels could be of the XDR type or of another type. Step 51 shows that the output of these hexagonal white pixels can be used directly for the luminance value Y of the YCbCr color space. In step 52 the color values of the destination color space are calculated from the red, green and blue pixel values according to a correspondent conversion matrix.

Figure 6:
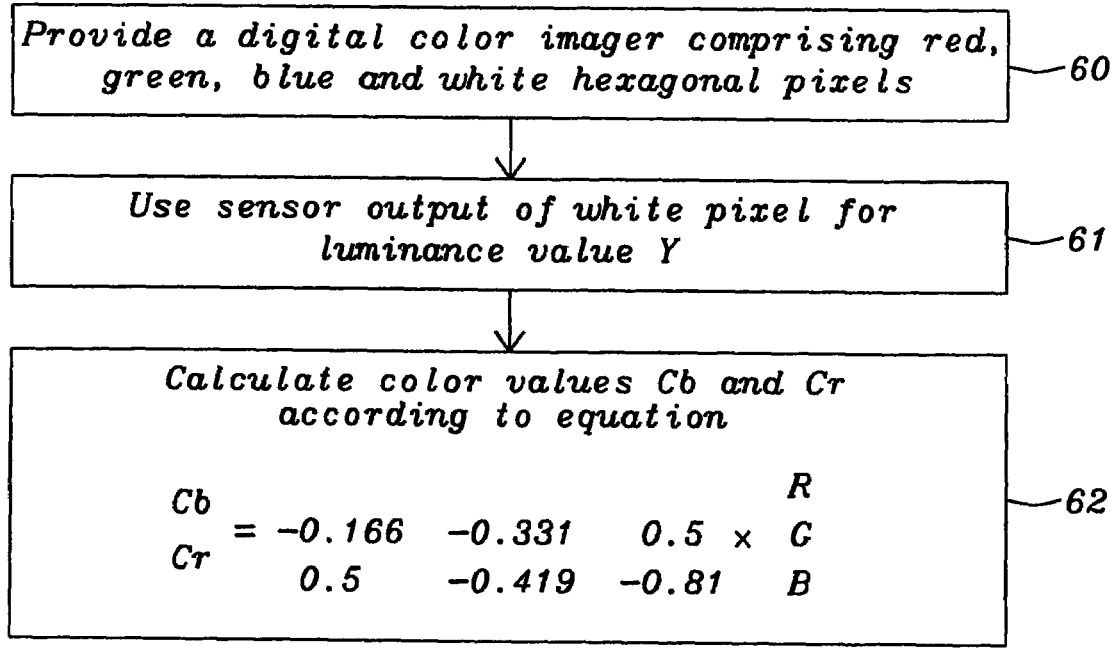
FIG. 6 shows a flowchart of a method to convert the output of hexagonal red, green, blue and white pixels into YCbCr color space.

FIG. 6 describes as a chosen example a method to convert the RGB values of an imager of the present invention comprising hexagonal red, green, blue and white pixels into an YCbCr color space. Step 60 describes the provision of hexagonal red, green, blue and white pixels in a digital color imager. As commented in regard of FIG. 5, the white pixels can have alternatively a larger size than the red, green, or blue pixels, wherein the white pixels have a shape of concatenated whole hexagonal pixels or having a shape of concatenated whole hexagonal pixels being concatenated again with fractions of hexagonal pixels as illustrated in FIGS. 4*b-d*. Said white pixels could be either pixels of the XDR type having the same size as the red, green or blue pixels being used in the digital imager or could be of a non-XDR type being twice as large as the red, green and green pixels. Step 61 shows that the output of these white pixels can be used directly for the luminance value Y of the YCbCr color space. In step 62 the color values Cb and Cr are calculated from the red, green and blue pixel values according to equation (2).

There are unlimited variations possible a layout of an "extended" Bayer representation. FIGS. 4*a-d* show just a few examples of a multitude of possible arrangements of Red (R), Blue (B), Green (G), and Black/White (W) pixels. The white pixels shown in FIGS. 4*a-d* could be of XDR-type or not independent of their size. A key point of the invention is to combine white pixels, being either from XDR-type or of larger size, with red, green and blue pixels. Due to the extended dynamic range of the Black/White (W) pixels or due to the extended size there is an extended range for luminance generated. The pixels are converted to RGB or YCbCr representation or to some other color space by interpolation.

It has to be understood that there is a trade-off to define the size of the white pixels in regard of spatial resolution and signal-to-noise ratio (SNR) in luminance to be considered. The bigger the pixels are, by e.g. combining white pixels, the higher is the SNR, but the spatial resolution decreases.

Alternatively the R, G, B pixels only shown in FIGS. 4*a-d* could be provided with filters of the respective colors while the white pixels would have no filters. By this measure a common kind of sensors could be deployed across the imager.

In summary, the advantages of the present invention are to achieve an extended luminance range, a correct color representation and an easy digital post-processing in YCbCr representation by introducing white pixels having either an extended dynamic range (XDR) or a larger size than the RGB pixels used in the digital color imager.

While the invention has been particularly shown and described with reference to the preferred embodiments thereof, it will be understood by those skilled in the art that various changes in form and details may be made without departing from the spirit and scope of the invention.

What is claimed is:

1. A method to convert pixel color values of a digital color imager into another color space having luminance as a component is comprising:

providing a digital color imager comprising hexagonal red, green, blue and white pixels;

use sensor output of white pixels for luminance value Y;

calculate color values of destination color space from the output of the red, green and blue pixels using a correspondent conversion matrix.

2. The method of claim 1 wherein said red, green and blue hexagonal pixels have correspondent color filters.

3. The method of claim 2 wherein all said pixels have an equilateral hexagonal shape.

4. The method of claim 2 wherein the arrangement of said red, green, blue, and white pixels is performed in a way that each white pixel must be adjacent to one red, one green and one blue pixel and each red, green, or blue pixel must be surrounded by white pixels only.

5. The method of claim 2 wherein said pixels have non-equilateral hexagonal shapes.

6. The method of claim 2 wherein said white pixels are XDR-type pixels.

7. The method of claim 2 wherein said red pixels are XDR-type pixels.

8. The method of claim 2 wherein said blue pixels are XDR-type pixels.

9. The method of claim 2 wherein said green pixels are XDR-type pixels.

10. The method of claim 2 wherein said white red, green, or blue pixels have all a same size.

11. A method to convert pixel color values of a digital color imager into another color space having luminance as a component is comprising:

providing a digital color imager comprising hexagonal red, green, and blue pixels and additionally white pixels, wherein said white pixels have been concatenated from hexagonal white pixels;

use sensor output of white pixels for luminance value Y;

calculate color values of destination color space from the output of the red, green and blue pixels using a correspondent conversion matrix.

12. The method of claim 11 wherein said red, green and blue hexagonal pixels have correspondent color filters.

13. The method of claim 11 wherein said hexagonal pixels have an equilateral hexagonal shape.

14. The method of claim 11 wherein the arrangement of said red, green, blue, and white pixels is performed in a way that each white pixel must be adjacent to one red, one green and one blue pixel and each red, green, or blue pixel must be surrounded by white pixels only.

15. The method of claim 11 wherein said pixels have non-equilateral hexagonal shapes.

16. The method of claim 11 wherein said white pixels are XDR-type pixels.

17. The method of claim 11 wherein said red pixels are XDR-type pixels.

18. The method of claim 11 wherein said blue pixels are XDR-type pixels.

19. The method of claim 11 wherein said green pixels are XDR-type pixels.

20. The method of claim 11 wherein said white pixels, before concatenation, and said red, green, or blue pixels have all a same size.

21. The method of claim 11 wherein said white pixels are concatenated from two white pixels wherein the concatenation is performed using white hexagonal pixels having the same size as said red, green or blue pixels.

22. The method of claim 11 wherein said white pixels are concatenated from two or three white pixels wherein the concatenation is performed using white hexagonal pixels having the same size as said red, green or blue pixels.

23. The method of claim 11 wherein said white pixels have a shape of concatenated whole hexagonal pixels being concatenated with portions of hexagonal pixels.

24. A method to convert pixel color values of a digital color imager into YCbCr color space:
  providing a digital color imager comprising hexagonal red, green, blue and white pixels;
  use sensor output of white pixels for luminance value Y;
  calculate color values Cb and Cr from the output of the red, green and blue pixels using transformation parameters.

25. The method of claim 24 wherein said calculation of the Cb and Cr components of YCbCr color space is performed according to the following equation:

$$\begin{bmatrix} Cb \\ Cr \end{bmatrix} = \begin{bmatrix} -0.169 & -0.331 & 0.5 \\ 0.5 & -0.419 & -0.81 \end{bmatrix} \times \begin{bmatrix} R \\ G \\ B \end{bmatrix},$$

wherein R is the output of the red sensor, G is the output of the green sensor and B is the output of the blue sensor.

26. The method of claim 24 wherein said red, green and blue hexagonal pixels have correspondent color filters.

27. The method of claim 24 wherein all said pixels have an equilateral hexagonal shape.

28. The method of claim 24 wherein the arrangement of said red, green, blue, and white pixels is performed in a way that each white pixel must be adjacent to one red, one green and one blue pixel and each red, green, or blue pixel must be surrounded by white pixels only.

29. The method of claim 24 wherein said pixels have non-equilateral hexagonal shapes.

30. The method of claim 24 wherein said white pixels are XDR-type pixels.

31. The method of claim 24 wherein said red pixels are XDR-type pixels.

32. The method of claim 24 wherein said blue pixels are XDR-type pixels.

33. The method of claim 24 wherein said green pixels are XDR-type pixels.

34. The method of claim 24 wherein said white red, green, or blue pixels have all a same size.

35. The method of claim 24 wherein said white pixels have a same size as the red, green, or blue pixels used.

36. A method to convert pixel color values of a digital color imager into YCbCr color space:
  providing a digital color imager comprising hexagonal red, green, and blue pixels and additionally white pixels, wherein said white pixels have been concatenated from hexagonal white pixels;
  use sensor output of white pixels for luminance value Y;
  calculate color values Cb and Cr from the output of the red, green and blue pixels using transformation parameters.

37. The method of claim 36 wherein said calculation of the Cb and Cr components of YCbCr color space is performed according to the following equation:

$$\begin{bmatrix} Cb \\ Cr \end{bmatrix} = \begin{bmatrix} -0.169 & -0.331 & 0.5 \\ 0.5 & -0.419 & -0.81 \end{bmatrix} \times \begin{bmatrix} R \\ G \\ B \end{bmatrix},$$

wherein R is the output of the red sensor, G is the output of the green sensor and B is the output of the blue sensor.

38. The method of claim 36 wherein said red, green and blue hexagonal pixels have correspondent color filters.

39. The method of claim 36 wherein said hexagonal pixels have an equilateral hexagonal shape.

40. The method of claim 36 wherein the arrangement of said red, green, blue, and white pixels is performed in a way that each white pixel must be adjacent to one red, one green and one blue pixel and each red, green, or blue pixel must be surrounded by white pixels only.

41. The method of claim 36 wherein said hexagonal pixels have non-equilateral hexagonal shapes.

42. The method of claim 36 wherein said white pixels are XDR-type pixels.

43. The method of claim 36 wherein said red pixels are XDR-type pixels.

44. The method of claim 36 wherein said blue pixels are XDR-type pixels.

45. The method of claim 36 wherein said green pixels are XDR-type pixels.

46. The method of claim 36 wherein said white pixels, before they were concatenated, and the red, green, or blue pixels have all a same size.

47. The method of claim 36 wherein said white pixels are concatenated from two white pixels wherein the concatenation is performed using white pixels having the same size as said red, green or blue pixels.

48. The method of claim 36 wherein said white pixels are concatenated from two or three white pixels wherein the concatenation is performed using white pixels having the same size as said red, green or blue pixels.

49. The method of claim 36 wherein said white pixels have a same size as the red, green, or blue pixels used.

50. The method of claim 36 wherein said white pixels have a shape of concatenated whole hexagonal pixels being concatenated with portions of hexagonal pixels.

* * * * *

UNITED STATES PATENT AND TRADEMARK OFFICE
CERTIFICATE OF CORRECTION

| | | |
|---|---|---|
| PATENT NO. | : 7,400,332 B2 | Page 1 of 1 |
| APPLICATION NO. | : 11/032540 | |
| DATED | : July 15, 2008 | |
| INVENTOR(S) | : Detlef Schweng and Stefan Spaeth | |

It is certified that error appears in the above-identified patent and that said Letters Patent is hereby corrected as shown below:

In the ASSIGNEE: (73), delete "Oigital Imaging Systems GmbH", and replace with -- Digital Imaging Systems GmbH --.

Signed and Sealed this

Twenty-fifth Day of May, 2010

David J. Kappos
*Director of the United States Patent and Trademark Office*